US00RE43065E

(19) United States
(12) Reissued Patent
Grohn et al.

(10) Patent Number: US RE43,065 E
(45) Date of Reissued Patent: Jan. 3, 2012

(54) PROCEDURE AND SYSTEM FOR THE TRANSMISSION OF INFORMATION AND ESTABLISHMENT OF A TELECOMMUNICATION CONNECTION

(75) Inventors: Tuomo Grohn, Helsinki (FI); Olli Pera, Oulu (FI); Sami Ala-Luukko, Helsinki (FI); Mika Sarkki, Espoo (FI)

(73) Assignee: Data Advisors LLC, Las Vegas, NV (US)

(21) Appl. No.: 11/241,902

(22) Filed: Sep. 30, 2005

Related U.S. Patent Documents

Reissue of:
(64) Patent No.: 6,628,951
Issued: Sep. 30, 2003
Appl. No.: 09/597,886
Filed: Jun. 20, 2000

(51) Int. Cl.
*H04W 40/00* (2009.01)

(52) U.S. Cl. ..... 455/445; 455/432.1; 455/433; 455/435.1; 379/210.01; 379/211.01; 379/212.01; 379/308; 370/351; 370/352; 370/353; 370/354; 370/357

(58) Field of Classification Search ..... 455/432, 455/433, 435, 445; 379/210.01, 211.01, 379/212.01, 308; 370/351–357
See application file for complete search history.

(56) References Cited

U.S. PATENT DOCUMENTS 5,504,804 A * 4/1996 Widmark et al. ..... 455/63.2
5,572,579 A * 11/1996 Orriss et al. ..... 379/142.01
5,839,072 A * 11/1998 Chien ..... 455/445
5,890,063 A * 3/1999 Mills ..... 455/433
5,901,359 A * 5/1999 Malmstrom ..... 455/461
5,953,673 A 9/1999 Neubauer et al.
5,978,673 A * 11/1999 Alperovich et al. ..... 455/417
6,011,838 A 1/2000 Cox
6,032,043 A 2/2000 Houde
6,101,387 A * 8/2000 Granberg et al. ..... 455/433
6,115,600 A 9/2000 Tuohino et al.
6,128,503 A 10/2000 Granberg et al.
6,175,622 B1 * 1/2001 Chiniwala et al. ..... 379/221.09

FOREIGN PATENT DOCUMENTS

WO WO 94/17644 8/1994
WO WO 97/14262 4/1997
WO WO 98/56206 12/1998

* cited by examiner

*Primary Examiner* — Stephen M D'Agosta

(57) ABSTRACT

Procedure and system for optimizing the route of a telecommunication connection to be set up in a telecommunication system that includes a mobile switching center (MSC), a service switching point (SSP), a service control point (SCP), a gateway (GW), and a subscriber register (HLR). The service switching point is connected to the service control point and the gateway is connected to the service control point and to the subscriber register. The telecommunication connection to be set up is directed via the service switching point to the service control point. A database query is sent from the service control point, via the gateway, to the subscriber register. In response, the subscriber register returns routing information, on the basis of which an optimal route to the mobile switching center under which the B-subscriber is currently located is determined.

34 Claims, 2 Drawing Sheets

PROCEDURE AND SYSTEM FOR THE TRANSMISSION OF INFORMATION AND ESTABLISHMENT OF A TELECOMMUNICATION CONNECTION

Matter enclosed in heavy brackets [ ] appears in the original patent but forms no part of this reissue specification; matter printed in italics indicates the additions made by reissue.

*CROSS REFERENCE TO RELATED APPLICATIONS*

*The present application is a reissue application of U.S. Pat. No. 6,628,951 which claims priority to PCT Application PCT/FI1998/001010 filed Dec. 21, 1998, and Finnish Application No. FI974590 filed Dec. 22, 1997.*

BACKGROUND OF THE INVENTION

1. Field of the Invention

The present invention relates to telecommunication technology and, more particularly, the invention is directed to optimization of the route of a telecommunication connection that is set up in a mobile communication network.

2. Description of Related Art

For a teleoperator, i.e. an owner or operator of a telecommunications network, it is important that telecommunication connections be set up in an optimal manner. Optimization may for example be based on the length of the route of the connection or on the network load resulting from the connection. Because the traffic in mobile communication networks is continuously increasing, it is particularly important that the load in such networks remain as low as possible. One approach to reducing the load in a mobile communication network is to set up or establish the connection to the mobile switching center then serving the called subscriber via a route that is as short as possible.

An intelligent network is formed by switching, control and functional components and a signaling network. A service switching point (SSP) of such intelligent networks is a modified telephone exchange that analyzes the traffic passing therethrough. When the SSP detects a certain number that meets a triggering criterion, it transmits a service request to a service control point (SCP). The information required for service control is stored in a service data point (SDP), from which the service control point can obtain the information that it needs.

Service switching points are connected via signaling channels to service control points, which implement intelligent network services by utilizing a service database. A service control point may for example perform a numerical conversion from the B-number to the corresponding C-number by accessing such correspondence information from the service database.

The communication protocols used in an intelligent network are rules by which the components of the intelligent network talk to each other. These protocols define the interfaces between components as well as the structure of the messages exchanged between them. Intelligent network components communicate with each other using common channel signaling (CCS). By ITU-T definition, common channel signaling is known as CCSS No 7. For communication between components, an intelligent network uses the services of the INAP (Intelligent Network Application Part) defined by ITU-T; the INAP application part is an intelligent network application protocol used, for example, for communication between a service control point and a service switching point. The MAP application part, on the other hand, is a portion of the signaling system of a mobile communication network that is used for signaling between the switching centers and registers of the mobile communication network.

In the GSM (Global System for Mobile communications) system, a call to be set up or established is routed as follows. A call setup request is sent from the calling subscriber's (A-subscriber's) terminal equipment to a gateway mobile switching center (GMSC), which then sends a query to the called subscriber's (B-subscriber's) home location register (HLR) to determine the mobile switching center (MSC) under which the B-subscriber's terminal device is currently located. The home location register is implemented as a database that contains such information as subscriber data, subscriber location data, call control data, short-message services and billing data.

Next, the home location register requests the visitor location register (VLR) for a roaming number MSRN (Mobile Subscriber Roaming Number) and returns the roaming number to the GMSC. The visitor location register is implemented as a database in a mobile communication network which contains the information required for the transmission of calls about each mobile subscriber currently located in the area of the network. The roaming number is a temporary identification number that is allocated to a mobile station recorded in the visitor location register and which is used by the mobile communication system for the muting of calls addressed to that particular subscriber.

Based on the roaming number, the GMSC then routes the call originated by the A-subscriber to the mobile switching center in whose location area (LA) the B-subscriber is currently located. The B-subscriber's mobile switching center in turn sets up a connection with the B-subscriber's terminal device.

The primary problem with the above-described routing procedure is that calls addressed to mobile stations are not automatically routed via the shortest route to the proper mobile switching center but may, instead, be routed via several switching centers. One solution that has been applied to eliminate this problem is to provide some service nodes (SN) and service control points with an MAP interface, thus making it possible to implement functionality and service similar to that provided by present invention. Such solutions, however, disadvantageously they bind the service to a certain base and assume that the service control point or service node is provided with an MAP interface.

In the procedure of the present invention, on the other hand, the routing of calls addressed to a terminal device is optimized by using an intelligent network service and a special gateway. By means of that gateway, a query is sent from the intelligent network system to a subscriber register to obtain B-subscriber data and, using that data, the call to be set up is routed directly to the mobile switching center in whose area the B-subscriber's terminal device is currently located. This arrangement and methodology additionally makes it possible to utilize other GSM network services.

OBJECTS AND SUMMARY OF THE INVENTION

It is accordingly the desideratum of the present invention to eliminate, or at least significantly reduce, the drawbacks and deficiencies of the prior art, as for example described hereinabove.

It is a particular object of the invention is to provide a new type of procedure and system for routing a new call being set up directly to the mobile switching center under which the B-subscriber is currently located.

The procedure of the invention is thus utilized to optimize the route of a telecommunication connection to be set up, as for example and preferably in a mobile communication system.

The telecommunication system of the present invention comprises a mobile switching center, a service switching point, a service control point, a gateway, and a subscriber register. The service switching point is connected to the service control point, and the subscriber register and service control point are connected to the gateway. The gateway further comprises means for handling a database query, a signaling query, a response to a database query, and a response to a signaling query.

In the method of the present invention, a telecommunication connection to be set up is directed via the service switching point to the service control point. From the service control point, a database query is performed, which is directed to the gateway. The database query is converted in the gateway into a signaling query which is sent to the subscriber register. Using the data in the subscriber register, a response to the signaling query is defined and returned to the gateway, at which the response to the signaling query is converted to a response to the database query, on the basis of which the service control point determines an optimal route to the appropriate mobile switching center.

In preferred embodiments of the invention, the response to the signaling query contains routing information which is used to optimize the route of the telecommunication connection to the mobile switching center. A connection to the mobile switching center, and further by way of example to the B-subscriber's terminal device, is then set up. The routing information may for example be a roaming number, such preferably as the Mobile Subscriber to Roaming Number MSRN.

In the same or other preferred embodiments of the invention, the gateway may be an MAP-INAP gateway, which comprises means for controlling the interface between the service control point and the database and means for controlling the interface between the gateway mobile services switching center and the subscriber register. The signaling query is preferably an MAP (Mobile Application Part) query and the database query an SDP (Service Data Point) query. As a consequence of this arrangement, the service control point of the intelligent network is able to use the subscriber data of the GSM network.

In these or other preferred embodiments of the invention, the subscriber register may be the home location register of the GSM system.

The present invention thus allows optimal routing to the mobile switching center under which the B-subscriber is then or currently located. If, according to the data in the visitor location register, the subscriber cannot be reached, then corresponding information is obtained. If the subscriber has transferred his or her calls to another number using the CFU (Call Forwarding Unconditional) supplementary service, this too will be known so that the call can be properly routed to the specified forward number.

As will be further appreciated, the inventive solution advantageously does not require any changes in the elements of the mobile communication network or in the intelligent network because the invention implements the enhanced service through the use of a separate MAP-INAP base.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements and method steps throughout the several figures.

Figure 4:
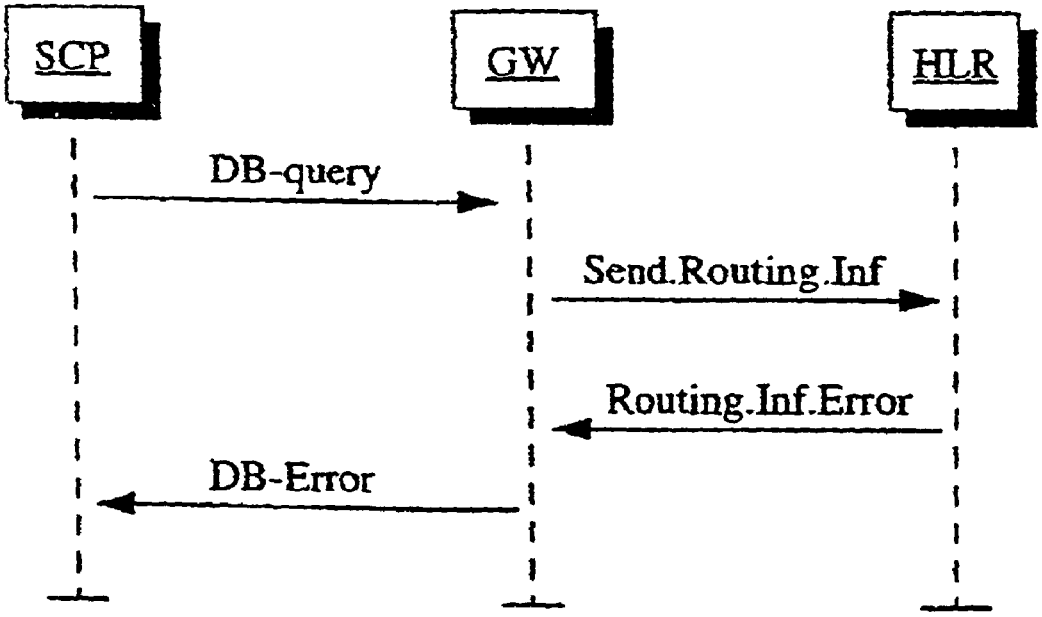
FIG. 4 diagrammatically depicts an example of signaling in a preferred embodiment of the inventive procedure in an error situation.
Figure 1:
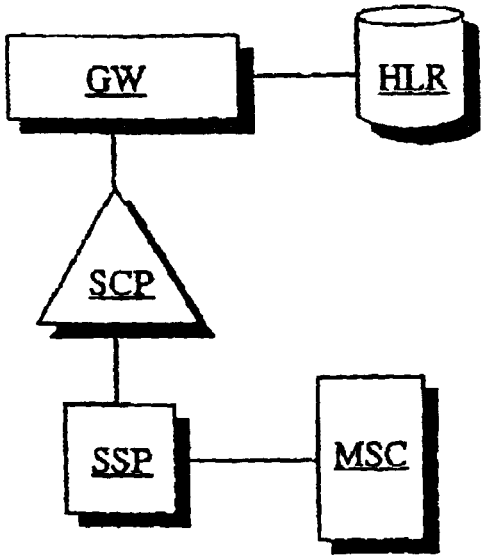
Figure 2:
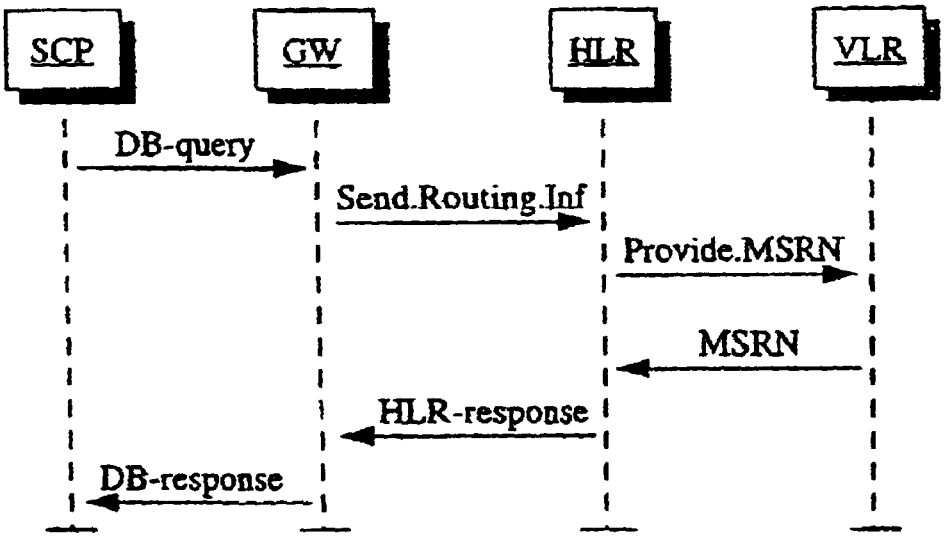

The signaling diagram in FIG. 4 comprises a service control point (SCP), an MAP-INAP gateway (GW) and a home location register (HLR).

DETAILED DESCRIPTION OF THE CURRENTLY PREFERRED EMBODIMENTS

Figure 1:
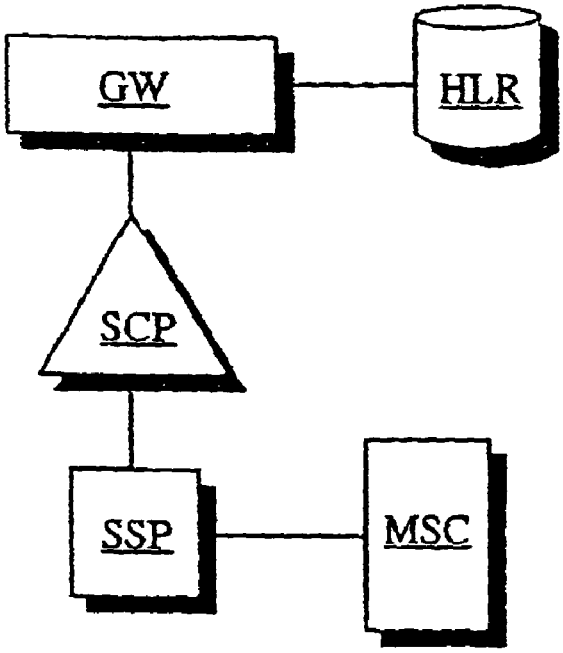
FIG. 1 is a block diagram of a system in accordance with the present invention.

The system configured in accordance with the present invention and illustrated in FIG. 1 comprises a mobile switching center MSC and a service switching point SSP which is connected to a service control point SCP. In addition, the service control point SCP is connected to a gateway GW which, in turn, is also connected to a subscriber register HLR.

Figure 2:
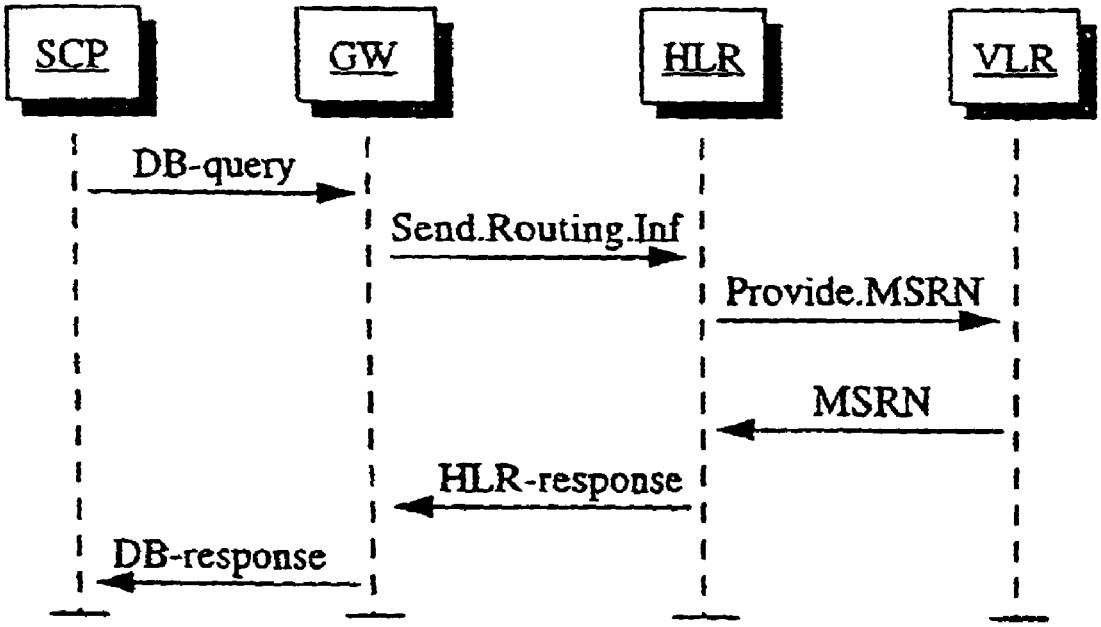
FIG. 2 diagrammatically depicts an example of signaling in a preferred embodiment of the inventive procedure in which the home location register provides, in response to a database query, a roaming number of the called or B-subscriber.

In the signaling diagram of FIG. 2, the system includes a service control point SCP, an MAP-INAP gateway GW, a home location register HLR, and a visitor location register (VLR).

Figure 3:
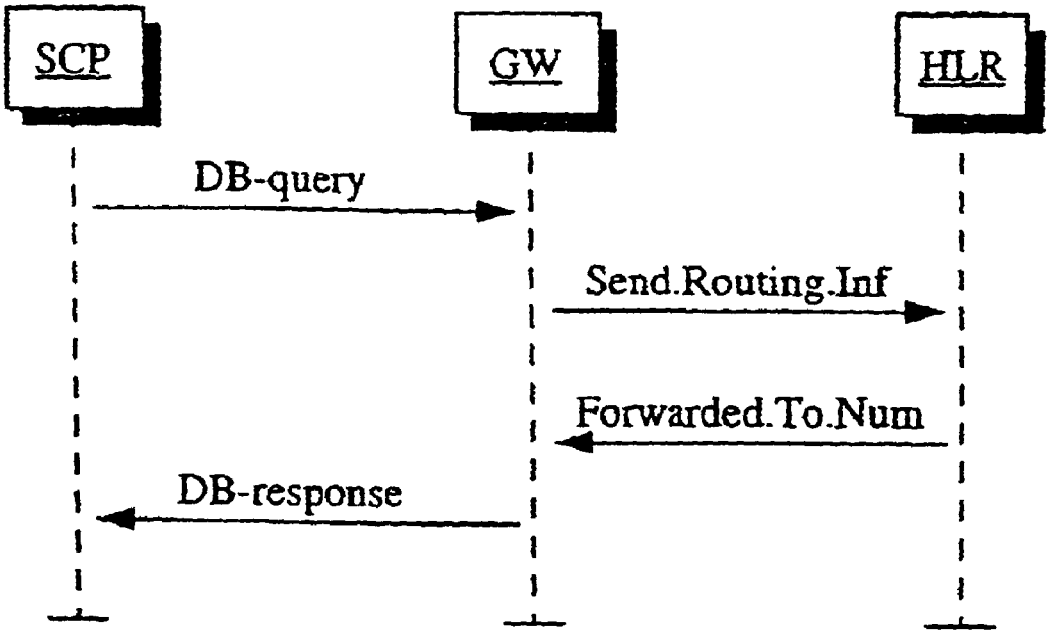
FIG. 3 diagrammatically depicts an example of signaling in a preferred embodiment of the procedure of the invention in a situation in which the B-subscriber has forwarded his or her calls to a C-number.

In the signaling diagram of FIG. 3, the system includes a service control point SCP, an MAP-INAP gateway 6W, and a home location register HLR. With initial reference to FIG. 1, an effort to establish a communication connection starts with a call setup request that is sent from the terminal device (not shown) of a calling or A-subscriber to the gateway mobile services switching center MSC. The gateway MSC detects the incoming call and further directs it to the service switching point SSP. From switching point SSP, the call is directed to the service control point SCP, which performs a database query to obtain routing information. In accordance with the procedure of the present invention, instead of directing the database query to the service data point, the query is directed to an MAP-INAP gateway GW, at which a conversion from a database query to a signaling query is performed. The MAP-INAP gateway may be readily implemented, as for example by using a separate service node provided with the required applications to implementation the appropriate interfaces or by installing the application in an existing intelligent network component, such as the service control point SCP.

The routing query is then sent from the gateway GW to the called or B-subscriber's home location register, at which a response to the signaling query is defined utilizing the data in the home location register HLR. The signaling query response consists of routing information, preferably a roaming number identified with the B-subscriber. The home location register returns the routing information to the gateway GW, which then performs a conversion so from the signaling query response to a database query response. The routing information is thus converted into a form understood by the service control point SCP. Based on the database query response received, the service control point next causes the service switching point to route the call directly to the mobile switching center under which he B-subscriber's terminal device is currently located.

FIG. 2 presents an example of the signaling procedure of the invention in a situation in which the home location register provides, in response to a database query, a roaming number of the called or B-subscriber. The service control point SCP sends a database query (DB-query) to obtain routing information MSRN. The database query is directed to an MAP-INAP gateway GW, at which a conversion from the database query to a signaling query is performed. The signaling query (Send.Routing.Inf) is then sent from the gateway to the B-subscriber's home location register HLR, where a response to the signaling query is defined using the data in the home location register. In currently-used techniques, the subscriber location data is not always automatically updated from the visitor location register to the home location register. In this case, the home location register HLR must first get routing information (Provide.MSRN) from the visitor location register VLR. The home location register then returns its response to the signaling query (HLR-response) to the gateway, which performs a conversation from the signaling query response (HLR-response) to a database query response (DB-response). The signaling query response (HLR-response) consists of routing information, preferably a roaming number.

FIG. 3 presents an example of the signaling procedure of the present invention in a situation in which the B-subscriber has forwarded his or her to another or C-number. From the service control point SCP, a database query (DB-query) is sent to obtain routing information MSRN. The database query is directed from service control point SCP to the MAP-INAP gateway GW, at which a conversion from the database query to a signaling query (Send.Routing.Inf) is preformed. The signaling query is then sent from the gateway to the home location register HLR of the B-subscriber where, based on the data in the home location register, a response to the signaling query in defined. The home location register HLR returns its response to the signaling query (Fwd.To.Number) to the gateway, which performs a conversion from the signaling query response to a database query response (DB-response). In this example, therefore, the response (Fwd.To.Number) to the signaling query is a C-number.

FIG. 4 illustrates an example of the inventive signaling procedure in a situation in which the B-subscriber cannot be reached or there is a malfunction in the telecommunication system. A database query (DB-query) is sent from the service control point SCP to obtain routing information. The database query is directed to the MAP-INAP gateway GW, at which a conversion from the database query to a signaling query is performed. Next, the signaling query (Send.Routing.Inf) is sent from the gateway to the home location register HLR of the B-subscriber and, based on the information in the home location register, a response (Routing.Inf.Error) to the signaling query is defined. If the subscriber terminal has been shut off or the subscriber is outside of the receiving area, then the response (Routing.Inf.Error) to the signaling query contains data indicating that the subscriber cannot be reached. If there is a malfunction in the system, then corresponding information can also be given to the service control point in the response (Routing.Inf.Error) to the signaling query. The home location register then returns the signaling query response to the gateway, which performs a conversion from the signaling query response to a database query response (DB-error).

The invention herein described and disclosed is based in part on commonly-owned Finnish Patent Application No. 982168 entitled "Procedure and System for the Transmission of Information and Setting Up of a Telecommunication Connection", the entire disclosure of which is hereby expressly incorporated by reference herein.

While there have shown and described and pointed out fundamental novel features of the invention as applied to preferred embodiments thereof, it will be understood that various omissions and substitutions and changes in the form and details of the methods and procedures described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A procedure for route optimization of a telecommunication connection to be set up between a calling subscriber and a called subscriber in a telecommunication system that includes a mobile switching center, a service control point, a service switching point connected to the service control point, a subscriber register, and a gateway connected to the service control point and to the subscriber register, comprising the steps of:

directing the telecommunication connection to be set up to the service control point via the service switching point;

performing a database query directed from the service control point and addressed to the subscriber register; and determining an optimal route to the mobile switching center currently serving the called subscriber based on a response from the subscriber register to the database query;

wherein said performing step comprises:

directing the database query from the service control point to the subscriber register via the gateway;

converting, in the gateway, the database query from the service control point into a signaling query;

sending the converted signaling query from the gateway to the subscriber register;

defining, at the subscriber register, a signaling query response to the converted signaling query;

sending the signaling query response from the subscriber register to the gateway;

converting, in the gateway, the signaling query response to a responsive database query; and returning the responsive database query from the gateway to the service control point.

2. The procedure of claim 1, wherein said determining step comprises:

generating optimized routing information for the telecommunication connection between the calling subscriber and the called subscriber using the responsive database query received by the service control point; and setting up the telecommunication connection to the mobile switching center currently serving the called subscriber using the generated routing information to thereby establish an optimized route between the calling subscriber and the called subscriber.

3. The procedure of claim 1, wherein the response from the subscriber register to the database query comprises routing information.

4. The procedure of claim 1, wherein the response from the subscriber register to the database query comprises routing information comprising a roaming number of the called subscriber.

5. The procedure of claim 4, wherein the roaming number comprises a Mobile Subscriber Roaming Number.

6. The procedure of claim 1, wherein the gateway comprises an MAP-INAP gateway comprising a database interface and a subscriber register interface.

7. The procedure of claim 1, wherein the signaling query comprises an MAP query.

8. The procedure of claim 1, wherein the database query comprises a Service Data Point query.

9. The procedure of claim 1, wherein the subscriber register comprises a home location register.

10. In a system for optimizing a route of a telecommunication connection to be set up between a calling subscriber and a called subscriber iD a telecommunication system that includes a mobile switching center, a service control point, a service switching point connected to the service control point, and a subscriber register, and wherein the telecommunication connection to be set up is directed to the service control point via the service switching point, the improvement comprising:

a gateway connected to the service control point and to the subscriber register, said gateway comprising:

means for handling a database query, a signaling query, a database query response and a signaling query response;

means for receiving a database query from said service control point;

means for changing said database query to said signaling query;

means for sending said signaling query to said subscriber register;

means for receiving a signaling query response from said subscriber register;

means for changing said signaling query response to said database query response; and means for sending said data query response to said service control point.

*11. A method comprising:*

*receiving, at a gateway, a database query from a service control point;*

*converting, at the gateway, the database query received from the service control point into a signaling query;*

*sending, from the gateway, the signaling query to a subscriber register;*

*receiving, at the gateway, a signaling query response from the subscriber register comprising routing information in a first format;*

*converting, at the gateway, the signaling query response comprising routing information in the first format into a database query response comprising the routing information in a second format; and*

*sending, from the gateway, the database query response comprising the routing information in the second format to the service control point,*

*wherein, in response to receiving the database query response, the service control point determines an optimal route to a mobile switching center serving the called terminal based on the database query response comprising routing information in the second format, and directs a service switching point to conduct routing for connection setup to the mobile switching center serving the called terminal.*

*12. The method of claim 11, wherein the service control point generates the database query in response to an incoming call received from the service switching point.*

*13. The method of claim 11, wherein the gateway is a mobile application part-intellectual network application part (MAP-INAP) gateway.*

*14. The method of claim 11, wherein the gateway is integrated with the service control point.*

*15. The method of claim 11, wherein the gateway is an independent service node.*

*16. The method of claim 11, wherein the subscriber register is a home location register.*

*17. The method of claim 11, wherein the routing information is a roaming number associated with the called terminal.*

*18. The method of claim 11, wherein the signaling query response is based on information provided by a visitor location register.*

*19. The method of claim 11, wherein the signaling query response includes a call forwarding number.*

*20. The method of claim 11, wherein the signaling query response includes information indicating that the called terminal cannot be reached.*

*21. The method of claim 11, wherein the gateway is part of a telecommunication system including the mobile switching center, the service control point, the service switching point communicatively connected to the service control point, and the subscriber register.*

*22. The method of claim 21, wherein the gateway is configured to handle the database query, the signaling query, the database query response, and the signaling query response.*

*23. A system comprising:*

*a service control point;*

*a service switching point;*

*a subscriber register; and*

*a gateway configured to:*

*receive a database query from the service control point;*

*convert the database query received from the service control point into a signaling query;*

*send the signaling query to the subscriber register;*

*receive, from the subscriber register, a response to the signaling query, the response comprising routing information in a first format;*

*convert the received response comprising routing information in the first format into a database query response comprising the routing information in a second format; and*

*send the database query response comprising the routing information in the second format to the service control point,*

*wherein, in response to receiving the database query response, the service control point is configured to determine an optimal route to a mobile switching center serving the called terminal based on the database query response comprising the routing information in the second format, and direct the service switching point to conduct routing for connection setup to the mobile switching center serving the called terminal.*

*24. The system of claim 23, wherein the service control point is configured to generate the database query in response to an incoming call received from the service switching point.*

*25. The system of claim 23, wherein the gateway is a mobile application part-intellectual network application part (MAP-INAP) gateway.*

*26. The system of claim 23, wherein the gateway is integrated with the service control point.*

*27. The system of claim 23, wherein the gateway is an independent service node.*

*28. The system of claim 23, wherein the subscriber register is a home location register.*

*29. The system of claim 23, wherein the routing information is a roaming number associated with the called terminal.*

*30. The system of claim 23, wherein the received response to the signaling query is based on information provided by a visitor location register.*

*31. The system of claim 23, wherein the received response to the signaling query includes a call forwarding number.*

*32. The system of claim 23, wherein the received response to the signaling query includes information indicating that the called terminal cannot be reached.*

*33. The system of claim 23, wherein the system further comprises the mobile switching center, and wherein the service switching point is communicatively connected to the service control point.*

*34. The system of claim 33, wherein the gateway is configured to handle the database query, the database query response, the signaling query, and the response to the signaling query.*

* * * * *

UNITED STATES PATENT AND TRADEMARK OFFICE

CERTIFICATE OF CORRECTION

PATENT NO. : RE43,065 E
APPLICATION NO. : 11/241902
DATED : January 3, 2012
INVENTOR(S) : Grohn et al.

It is certified that error appears in the above-identified patent and that said Letters Patent is hereby corrected as shown below:

In Fig. 1, Sheet 1 of 2, delete "Fig" and insert -- Fig. --, therefor at each occurrence throughout the drawings.

Delete sheet 1 of drawings and substitute the attached sheet 1, therefor.

In Column 1, Line 59, delete "defme" and insert -- define --, therefor.

In Column 2, Line 30, delete "muting" and insert -- routing --, therefor.

In Column 3, Line 38, delete "Subscriber to" and insert -- Subscriber --, therefor.

In Column 4, Line 45, delete "6W," and insert -- GW, --, therefor.

In Column 4, Lines 46-63, delete "With initial.....point SCP." and insert the same at Line 47 as a new paragraph.

In Column 5, Line 4, delete "conversion so" and insert -- conversion --, therefor.

In Column 5, Line 36, delete "her to" and insert -- her calls to --, therefor.

In Column 7, Line 28, in Claim 10, delete "iD a" and insert -- ID --, therefor.

Signed and Sealed this
Twenty-seventh Day of November, 2012

David J. Kappos

David J. Kappos
*Director of the United States Patent and Trademark Office*